United States Patent Office 3,454,584
Patented July 8, 1969

3,454,584
N,N'[2,2 - BIS - (p-CHLOROPHENOXY)TRIMETHYL-
ENE] DIPYRROLIDINE AND DIPIPERIDINE
Rudolf G. Griot, Florham Park, N.J., assignor to Sandoz
Inc., Hanover, N.J.
No Drawing. Filed July 21, 1966, Ser. No. 566,768
Int. Cl. C07d 29/18, 27/04; A61k 27/00
U.S. Cl. 260—294.7                                    3 Claims

ABSTRACT OF THE DISCLOSURE

N,N' - [2,2 - bis - (p - chlorophenoxy)trimethylene] dipyrrolidine and N,N' - [2,2 - bis - (p - chlorophenoxy) trimethylene]dipiperidine, as well as their non-toxic pharmaceutically acceptable acid addition salts, are useful as pharmaceuticals, and may be obtained either by reduction of their corresponding amides, or by reacting an appropriate amine with a 2,2-bis-(p-chlorophenoxy)-1,3-propane-diol-di-tosyl ester.

---

This invention relates to derivatives of heterocyclic amines. In particular, the invention pertains to compounds of the structural formula

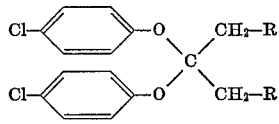

I wherein R represents a saturated monocyclic ring

containing in the ring, in addition to the nitrogen atom, from 4 to 5 carbon atoms, e.g., pyrrolidino and piperidino, and process for preparing the same. The invention also relates to intermediates which are useful in preparing the above compounds and processes for preparing said intermediates.

The compounds of Formula I are preferably prepared by reducing a dialkyl ester of bis-(p-chlorophenoxy) malonic acid or a bis-(p-chlorophenoxy)malonyl halide to form the compound 2,2-bis-(p-chlorophenoxy)-1,3-propanediol, reacting the latter with either tosyl chloride or brosylchloride (p-bromobenzenesulfonyl chloride) to form the corresponding tosylate or brosylate with an appropriate amine. Alternatively, such compounds may be prepared by reacting a dialkyl ester of bis-(p-chlorophenoxy)malonic acid or a bis-(p-chlorophenoxy)malonyl halide with an appropriate amine and reducing the resulting product. These processes may be represented structurally as follows:

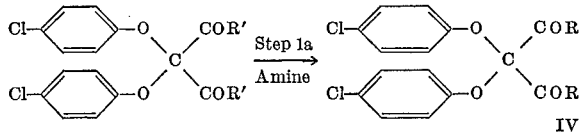

IV

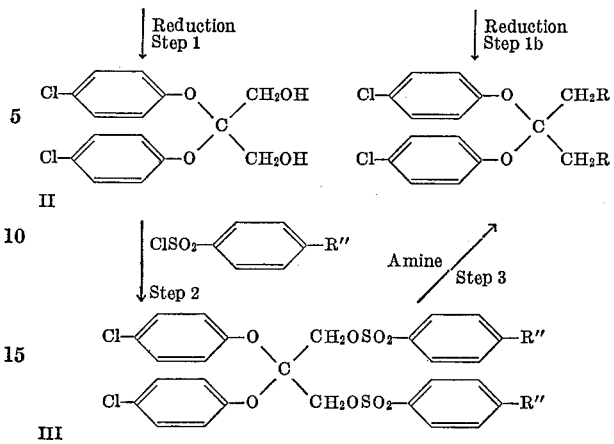

wherein

R is as previously defined,
R' represents lower alkoxy, preferably methoxy or ethoxy; or halogen, preferably chloro or bromo; and
R" represents methyl or bromo.

As indicated supra, the preferred process proceeds via Steps 1, 2 and 3. In Step 1, the bis-(p-chlorophenoxy) malonic acid dialkyl ester or the corresponding malonyl halide is reduced to form the compound 2,2-bis-(p-chlorophenoxy)-1,3-propanediol (II). The reduction is conveniently effected in an inert organic solvent, preferably a lower alkanol, such as methanol and ethanol, employing an appropriate hydride reducing agent. When a bis-(p-chlorophenoxy)malonyl halide is employed as the starting material, the reduction is preferably carried out employing lithium aluminum hydride as the reducing agent whereas when a bis-(p-chlorophenoxy)malonic acid dialkyl ester is used as the starting material the reduction is preferably effected employing sodium borohydride although lithium aluminum hydride can also be used. The reduction of the bis-(p-chlorophenoxy)malonic acid dialkyl ester with sodium borohydride results in the formation of the intermediate boron complex of the formula

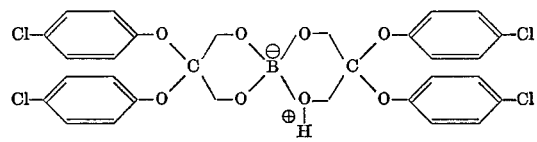

Such complex can be readily isolated in conventional manner converted in situ to the desired diol (II) by treatment with aqueous ammonia solution or aqueous sodium fluoride solution. The reduction of either the malonic acid diester or malonyl halide is preferably carried out at reflux temperature although elevated temperatures up to reflux temperature can be employed. The resulting diol (II) can be readily isolated employing conventional techniques.

In Step 2 of the process the diol (II) is converted to the tosylate or brosylate (III). This is readily accomplished in conventional manner by reacting the diol with the arylsulfonyl chloride at room temperature (20° C.) and in a basic, inert organic solvent which is capable of taking up the hydrogen chloride liberated during the reaction. Suitable solvents include pyridine and triethylamine. The resulting tosylate or brosylate (III) is readily recovered in conventional manner.

The tosylate or brosylate thus obtained is then reacted (Step 3) in conventional manner with an appropriate amine in a pressure bottle to form the corresponding compound of Formula I. This reaction is preferably carried out in an inert organic solvent, such as dimethylacetamide and diethylacetamide, and at an elevated temperature of from 120° to 180° C. However, the use of a solvent is not necessary since an excess of the amine can be used for this purpose. The desired product (I) is recovered employing conventional techniques.

Step 1a of the alternative process involves the reaction of a dialkyl ester of bis-(p-chlorophenoxy)malonic acid or a bis-(p-chlorophenoxy)malonyl halide with an appropriate amine to form the corresponding compound of Formula IV. When a malonyl halide is employed as a reactant, the reaction is desirably carried out at room temperature or below and in an inert organic solvent, such as benzene, toluene, methylene chloride, diethyl ether and the like. When a malonic acid ester is used, the reaction is conveniently effected in a suitable inert organic solvent, such as a lower alkanol, e.g., methanol and ethanol, and at room temperature or elevated temperature. The resulting compound (IV) is readily recovered in conventional manner.

The reduction of compound (IV) as indicated by Step 1b is effected in conventional manner employing an inert organic solvent, such as tetrahydrofuran, diethyl ether and the like, and an aluminum hydride reducing agent, preferably, lithium aluminum hydride. The reduction may be carried out at room temperature or elevated temperatures up to reflux temperature. Recovery of the desired product (I) is effected in conventional manner.

The malonic acid diesters employed as starting materials may be prepared by reacting the sodium salt of p-chlorophenol with a dihalomalonic acid ester. This process may be represented structurally as follows:

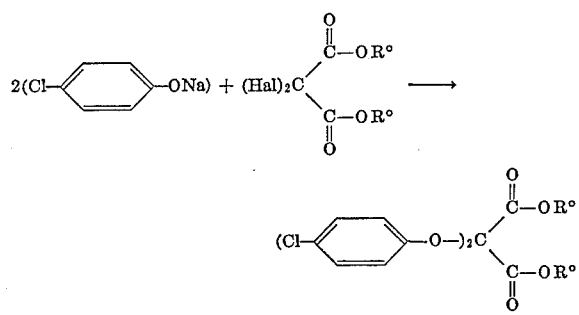

wherein

R° represents lower alkyl and
Hal represents halogen, preferably chlorine or bromine.

This reaction is conveniently carried out in a suitable inert organic solvent, such as dimethylacetamide, diethylacetamide, dimethylformamide or tetramethylurea, and at room temperature or elevated temperatures up to about 80° C.

The malonyl halides employed as starting materials are prepared from the corresponding malonic acid which in turn is obtained from the corresponding malonic acid diesters. This process may be illustrated as follows:

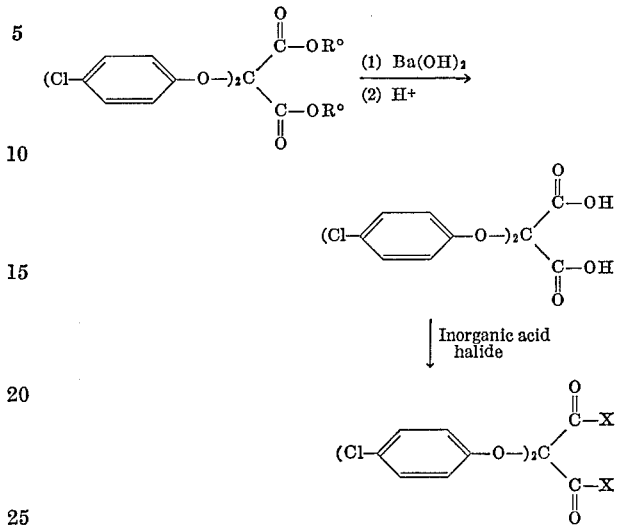

The bis-(p-chlorophenoxy)malonic acid is obtained by treating the corresponding diester with barium hydroxide at room temperature (20° C.) or below and in a suitable inert solvent system. Desirably, the solvent system is composed of a mixture of water and a water-miscible organic solvent containing such amounts of each as may be necessary to solubilize the barium hydroxide and malonic acid ester, respectively. Suitable organic solvents include the lower alkanols, e.g., methanol and ethanol, and ethers, e.g., diethyl ether, dioxane and tetrahydrofuran. The resulting insoluble barium salt of the bis-(p-chlorophenoxy) malonic acid is then converted to the free acid by treating said salt at room temperature and in a suitable inert organic solvent, such as a lower alkanol, e.g., methanol, with a strong acid, preferably a mineral acid, such as sulfuric acid. The desired malonyl halide is then obtained by treating the free acid at an elevated temperature of up to about 50° C. and preferably in the presence of an inert organic solvent, such as diethyl ether, dioxane or tetrahydrofuran, with an inorganic acid halide, preferably thionyl chloride or thionyl bromide.

The compounds of Formula I are useful because they possess pharmacological activity. In particular, such compounds are useful as anorexigenic and hypocholesteremic agents. For the above uses, the compounds may be combined with a pharmaceutically acceptable carrier, and such other conventional adjuvants, as may be necessary, and administered in such forms as tablets, capsules, elixirs, suspensions or solutions. Furthermore, the compounds may be similarly administered in the form of their non-toxic pharmaceutically acceptable acid addition salts. Such salts possess the same order of activity as the free base, are readily prepared in conventional manner by reacting the base with the appropriate acid and accordingly are included within the scope of the invention. Representative of such salts are the mineral acids salts, such as the hydrobromide, hydrochloride, sulfate, phosphate and the like and the organic acid salts such as the benzoate, acetate, maleate, p-toluenesulfonate, benzenesulfonate and the like.

The dosage administered will, of course, vary depending on the compound employed and the therapy desired. However, in general, satisfactory results are obtained when administered at a daily dosage of from about 200 milligrams to about 800 milligrams, preferably given in divided doses of from about 50 milligrams to about 400 milligrams throughout the day or in sustained release form.

A representative formulation suitable for oral administration is a tablet prepared by standard tabletting techniques and containing the following:

| Ingredient: | Parts by weight |
|---|---|
| N,N¹-[2,2 - bis - (p - chlorophenoxy)trimethylene] dipyrrolidine (or acid addition salt thereof) | *50 |
| Tragacanth | 2 |
| Lactose | 39.5 |
| Corn starch | 5 |
| Talcum | 3 |
| Magnesium stearate | 0.5 |

* Calculated as the free base.

The following examples show representative compounds contemplated by this invention and the manner in which such compounds are prepared. However, it is to be understood that these examples are intended for purposes of illustration only and are not intended as in any way limiting the scope of the invention which is defined in the appended claims.

EXAMPLE 1

N,N¹-[2,2-bis-(p-chlorophenoxy)trimethylene] dipyrrolidine

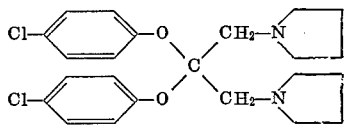

Step A: Preparation of bis-(p-chlorophenoxy)malonic acid diethyl ester.—Sodium hydride in mineral oil (56.7%), 43.3 g. (1.0 mole), is washed with dry, low boiling petroleum ether and the washed sodium hydride suspended in 1500 ml. of dimethylacetamide. The resulting suspension is cooled to 0° C. and 141.4 g. (1.10 moles) of p-chlorophenol is added with stirring to the cooled suspension at such a rate that the temperature thereof does not exceed 10° C. (external cooling with an ice/salt bath being employed as necessary). After all of the p-chlorophenol is added, the mixture is stirred for an additional hour and then 159 g. (0.5 mole) of diethyldibromomalonate is added to the mixture fairly rapidly allowing the temperature of the mixture to rise to about 32° C. Stirring is continued for 88 hours and then ¾ of the solvent is evaporated in vacuo. To the resulting concentrate is added 1500 ml. of ethyl acetate, and the mixture thus obtained is then washed twice with 1500 ml. (each) of water and twice with 750 ml. (each) of 2 N aqueous sodium hydroxide. The washed organic phase is then dried over anhydrous magnesium sulfate, filtered and the filtrate evaporated. The residue is recrystallized from 95% ethanol to obtain bis-(p-chlorophenoxy)malonic acid diethyl ester, M.P. 48–50° C.

Step B: Preparation of 2,2-bis(p-chlorophenoxy)-1,3-propanediol.—To a solution of 206.5 g. (0.5 mole) of bis-(p-chlorophenoxy)malonic acid diethyl ester in 2500 ml. of absolute ethanol is added, over a period of ½ hour, 66.2 g. (1.75 mole) of sodium borohydride while maintaining the temperature of the reaction at about 35–45° C. The mixture is then refluxed for 4 hours, the ethanol evaporated off and the residue (Boron complex) taken up in 2000 ml. of dimethylacetamide. To the resultant is added (portionwise) 200 ml. of concentrated ammonium hydroxide, and the resulting mixture allowed to stand for ½ hour at room temperature (20° C.) and then evaporated under a water aspirator vacuum at 70–80° C. To the residue is added 3000 ml. of ethyl acetate, and the resulting mixture extracted twice with 2000 ml. (each) of water. The ethyl acetate layer is then dried over sodium sulfate, filtered and the ethyl acetate evaporated off. The resulting oil is added to 3000 ml. of carbon tetrachloride, and the mixture cooled to room temperature to yield a white voluminous fluffy crystalline product. After crystallization is complete, the mixture is cooled to 0° C. using an ice/salt bath. The crystalline product thus obtained is filtered off, washed first with cold (0° C.) carbon tetrachloride and then with low boiling (30–60° C.) petroleum ether and then dried in a high vacuum oven at 50° C. To obtain 2,2-bis-(p-chlorophenoxy)-1,3-propanediol, M.P. 87–89° C. Additional material, M.P. 87–92° C., is obtained from the mother liquor.

Step C: Preparation of 2,2-bis-(p-chlorophenoxy)-1,3-propanediol di-(p-toluenesulfonyl)ester.—To a solution of 164.6 g. (0.5 mole) of 2,2-bis-(p-chlorophenoxy)-1,3-propanediol in 500 ml. of pyridine is added rapidly dropwise 200 g. (1.1 mole) of p-toluenesulfonyl chloride in 250 ml. of chloroform. The resulting mixture is then refluxed for 16 hours, the solvents evaporated off and the residue taken up in ethyl acetate. The resultant is then extracted first with water, then twice with 2 N aqueous sodium carbonate, then with 2 N aqueous hydrochloric acid, and finally with 2 N aqueous sodium carbonate. The ethyl acetate layer is then dried over magnesium sulfate-charcoal, filtered and the filtrate concentrated to about ⅒ of its original volume. To the concentrate is then added isopropyl ether, and the resulting mixture cooled in an ice bath. The crystalline product thus obtained is filtered off, washed with isopropyl ether and dried in a high vacuum oven at 100° C. to obtain 2,2-bis-(p-chlorophenoxy) - 1,3 - propanediol di - (p-toluenesulfonyl)ester, M.P. 140–141° C. Additional material, M.P. 137–137.5° C. is obtained from the mother liquor.

Step D: Preparation of N,N¹-[2,2-bis-(p-chlorophenoxy) trimethylene]dipyrrolidine.—A mixture of 30.0 g. of 2,2-bis-(p-chlorophenoxy)-1,3-propanediol di - (p-toluenesulfonyl)ester and 50.0 g. of pyrrolidine is autoclaved at 110° C. under 1000 p.s.i.g. nitrogen pressure for 18 hours. The excess pyrrolidine is then evaporated off and the desired product separated on a silica column using benzene, then mixtures of benzene and chloroform and finally chloroform. The thus-obtained product is crystalized from ethanol to obtain N,N¹-[2,2-bis-(p-chlorophenoxy)trimethylene]dipyrrolidine, M.P. 107–108.5° C.

The free base is dissolved in isopropanol and to the resulting solution is added an equivalent amount of fumaric acid in isopropanol. The mixture is cooled, and the crystalline material which forms filtered off, washed first with cold isopropanol and then with cold isopropyl ether and then dried to obtain N,N¹ - [2,2 - bis - (p-chlorophenoxy)trimethylene]dipyrrolidine fumarate, M.P. 161.5–162.5° C.

EXAMPLE 2

N,N¹-[2,2-bis-(p-chlorophenoxy)trimethylene] dipiperidine

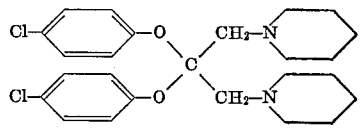

A mixture of 40.0 g. (0.063 mole) of 2,2-bis-(p-chlorophenoxy) - 1,3 - propanediol di - (p-toluenesulfonyl)ester, 53.5 g. (0.63 mole) of piperidine and 200 ml. of dimethylacetamide is autoclaved at 135–140° C. under 1000 p.s.i.g. nitrogen pressure for 24 hours. The dimethylacetamide and excess piperidine is then evaporated off, the residue taken up in chloroform and the resulting mixture extracted twice with water and then twice with 2 N aqueous hydrochloric acid. The chloroform layer is then dried over magnesium sulfate, filtered and evaporated. The residue thus obtained is crystallized from ethanol, cooled to −60° C. using a Dry Ice/methanol bath, and the resulting product filtered off and washed first with cold ethanol (−60° C.) and then with cold isopropyl ether (−60° C.). The thus-washed product is dried for 2 hours at 75° C. with high vacuum to obtain N,N¹-[2,2-bis-(p - chlorophenoxy)trimethylene]dipiperidine dihydrochloride, M.P. 196–197° C.

EXAMPLE 3

N,N¹ - [2,2-bis-(p-chlorophenoxy)trimethylene]dipyrrolidine (alternate process)

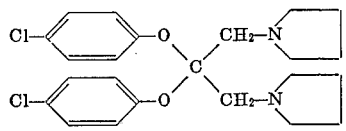

Step A: Preparation of bis-(p-chlorophenoxy)malonic acid.—To a mixture of 250 ml. of methanol and 20 ml. of water, heated slightly (30° C.) on a water bath, is added 16.1 g. (0.05 mole) of barium hydroxide. To the resulting practically-clear solution is added a solution of 20.65 g. (0.05 mole) of bis-(p-chlorophenoxy)malonic acid diethyl ester in 50 ml. of methanol. The resulting suspension is kept on the water bath for 15 minutes, and the solids then filtered off and dried in an oven under high vacuum. The dried solids, 4.92 g., are suspended in 50 ml. of ethanol and a solution of 1.025 g. of concentrated sulfuric acid in 10 ml. of water is added to the suspension. The resulting mixture is agitated for ½ hour, the insoluble material filtered off and the filtrate evaporated at room temperature under high vacuum. The resulting oil is dissolved in 50 ml. of diethyl ether, the ether solution dried over magnesium sulfate and the solvent recovered with a water aspirator. The oil thus obtained is crystallized from ethyl acetatecyclohexane, and the resulting solids recrystallized from ethyl acetatecyclohexane to obtain bis-(p-chlorophenoxy)malonic acid, M.P. 159–160° C. (dec.).

Step B: Preparation of bis-(p-chlorophenoxy)malonyl chloride.—To 106 g. of bis-(p-chlorophenoxy)malonic acid dissolved in 250 ml. of dry diethyl ether is added 65 ml. of thionyl chloride and 2 ml. of dimethylformamide. The mixture is refluxed for 4 hours, and then the solvent and excess thionyl chloride evaporated at 40° C. under reduced pressure. Dry carbon tetrachloride, 100 ml., is then added, and the resulting solution filtered and then evaporated at 40° C. under reduced pressure to yield bis-(p-chlorophenoxy)maloyl chloride as a viscous oil which crystallized slowly upon standing at room temperature. The crude crystalline material is washed with cold dry pentane and dried overnight at 20° C./0.1 mm. to yield analytically pure bis-(p-chlorophenoxy)malonyl chloride, M.P. 63–66° C., B.P. 154° C./0.15 mm.

Step C: Preparation of N,N¹-[2,2-bis-(p-chlorophenoxy)malonyl]dipyrrolidine.—To a solution of 32 g. (0.45 mole) of pyrrolidine in 100 ml. of toluene is added dropwise a solution of 39.4 g. (0.1 mole) of bis-(p-chlorophenoxy)maloyl chloride in 100 ml. of toluene while maintaining the temperature of the mixture between −10° to 5° C. by external cooling. After the addition is completed, the mixture is allowed to reach room temperature, then filtered and the filtrate treated with aqueous sodium bicarbonate solution and then washed with water and evaporated to yield N,N¹-[2,2-bis-(p-chlorophenoxy)malonyl]dipyrrolidine.

Step D: Preparation of N,N¹-[2,2-bis-(p-chlorophenoxy)trimethylene]-dipyrrolidine.—To a flask equipped with a stirrer, dropping funnel, condenser and Soxhelt tube containing 46.3 g. (0.10 mole) of N,N¹-[2,2-bis-(p-chlorophenoxy)malonyl]dipyrrolidine is added 7.6 g. (0.20 mole) of lithium aluminum hydride in 200 ml. of tetrahydrofuran. The contents of the flask are then stirred and refluxed for 4 hours. The resulting mixture is then cooled to 0° C., and 5 ml. of ethyl acetate is then added to destroy any excess lithium aluminum hydride. To the resulting mixture is then added 50 ml. of a 50% aqueous solution of sodium hydroxide with vigorous stirring. The mixture thus obtained is centrifuged, the organic phase separated from the gelatinous residue and the latter stirred with tetrahydrofuran and centrifuged. The organic phase is separated from the gelatinous residue, then combined with that previously obtained and evaporated. The resulting residue is crystallized from ethanol to yield N,N¹-[2,2 - bis -- (p - chlorophenoxy)trimethylene]dipyrrolidine, M.P. 107–108.5° C.

What is claimed is:
1. A compound selected from the group consisting of those of the formula

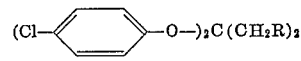

and pharmaceutically acceptable acid addition salts thereof, wherein R represents a saturated, monocyclic ring

containing in the ring, in addition to the nitrogen atom, from 4 to 5 carbon atoms.

2. N,N¹ - [2,2 - bis - (p - chlorophenoxy)trimethylene]dipyrrolidine.

3. N,N¹ - [2,2 - bis - (p - chlorophenoxy)trimethylene]dipiperidine.

References Cited

UNITED STATES PATENTS

| | | | |
|---|---|---|---|
| 1,915,334 | 6/1933 | Salzberg et al. | 260—243 |
| 2,075,359 | 3/1937 | Salzberg et al. | 167—22 |
| 2,330,234 | 9/1943 | Moyle | 260—613 |
| 2,941,004 | 6/1960 | Pinson et al. | |

HENRY R. JILES, *Primary Examiner.*

S. D. WINTERS, *Assistant Examiner.*

U.S. Cl. X.R.

260—294, 326.3, 326.5, 456, 473, 520, 544, 606.5, 613; 424—267, 274